US007658576B1

(12) United States Patent
Buzdum et al.

(10) Patent No.: US 7,658,576 B1
(45) Date of Patent: Feb. 9, 2010

(54) HOLE SAW HAVING EFFICIENT SLUG REMOVAL

(76) Inventors: Mirko Buzdum, N7721 Maple Ridge Rd., Oconomowoc, WI (US) 53066; Richard E. Capstran, 1840 N. Prospect Ave. #516, Milwaukee, WI (US) 53207

( * ) Notice: Subject to any disclaimer, the term of this patent is extended or adjusted under 35 U.S.C. 154(b) by 0 days.

(21) Appl. No.: 12/356,366

(22) Filed: Jan. 20, 2009

Related U.S. Application Data

(63) Continuation-in-part of application No. 11/832,970, filed on Aug. 2, 2007.

(51) Int. Cl.
*B23B 51/04* (2006.01)

(52) U.S. Cl. ................... 408/204; 408/68; 408/206; 408/703

(58) Field of Classification Search ............. 408/68, 408/204, 206, 703; B23B 51/04, 51/05
See application file for complete search history.

(56) References Cited

U.S. PATENT DOCUMENTS

| | | | | |
|---|---|---|---|---|
| 146,901 | A * | 1/1874 | Harrison et al. ............. 127/30 |
| 308,842 | A * | 12/1884 | Hunt ............................ 408/86 |
| 1,234,467 | A * | 7/1917 | Hamilton ..................... 408/68 |
| 3,265,104 | A * | 8/1966 | Gallo, Sr. .................... 408/68 |
| 3,390,596 | A * | 7/1968 | Trevathan .................... 408/68 |
| 3,870,431 | A * | 3/1975 | Luckenbill et al. ......... 408/111 |
| 4,406,334 | A * | 9/1983 | Baumann et al. ........... 175/315 |
| 4,595,321 | A * | 6/1986 | Van Dalen .................. 408/205 |
| 4,652,185 | A * | 3/1987 | Malrick ....................... 408/68 |
| 4,755,087 | A * | 7/1988 | Parent ......................... 408/68 |
| 5,205,685 | A | 4/1993 | Herbert |
| 5,366,326 | A * | 11/1994 | Converse .................. 408/72 B |
| 5,435,672 | A * | 7/1995 | Hall et al. ................... 408/68 |
| 5,651,646 | A | 7/1997 | Banke et al. |
| 5,667,846 | A * | 9/1997 | Thomas ..................... 427/379 |
| 5,676,501 | A * | 10/1997 | Peetz et al. ................ 408/204 |
| 5,721,053 | A * | 2/1998 | Thomas ..................... 428/422 |
| 5,789,083 | A * | 8/1998 | Thomas ..................... 428/422 |
| 5,842,820 | A * | 12/1998 | Lee et al. ................... 408/204 |
| 5,895,178 | A * | 4/1999 | Young ........................ 409/206 |
| 5,922,468 | A * | 7/1999 | Huesmann et al. ......... 428/422 |
| 5,934,845 | A * | 8/1999 | Frey ............................ 408/68 |
| 6,123,999 | A * | 9/2000 | Felix et al. ................. 427/449 |
| 6,206,616 | B1 * | 3/2001 | Smith et al. ................ 408/1 R |
| 6,599,063 | B1 * | 7/2003 | Capstran .................... 408/1 R |
| 6,677,044 | B2 * | 1/2004 | Oka et al. .................. 428/421 |
| 6,857,831 | B2 | 2/2005 | Davis |
| 2004/0042861 | A1 * | 3/2004 | Capstran .................... 409/132 |
| 2005/0111926 | A9 * | 5/2005 | Cardemon et al. ......... 408/1 R |
| 2006/0199013 | A1 * | 9/2006 | Malshe et al. ............. 428/409 |
| 2006/0210366 | A1 * | 9/2006 | Kozak ......................... 408/68 |
| 2006/0257220 | A1 * | 11/2006 | Gertner ...................... 408/202 |
| 2007/0212179 | A1 * | 9/2007 | Khangar et al. ............ 408/204 |
| 2009/0035082 | A1 * | 2/2009 | Singh ......................... 408/204 |
| 2009/0208302 | A1 * | 8/2009 | Durfee ....................... 408/206 |

FOREIGN PATENT DOCUMENTS

WO    WO 9427773 A1 * 12/1994

* cited by examiner

*Primary Examiner*—Eric A Gates
(74) *Attorney, Agent, or Firm*—Donald J. Ersler

(57) ABSTRACT

A hole saw having efficient slug removal preferably includes a saw cup, a shank portion and a pilot cutting device. A cutting surface is formed on an open end of the saw cup. An inside surface of the saw cup is given a low friction treatment and preferably an outside surface thereof. The shank portion is retained on a closed end of the saw cup. The pilot cutting device is preferably a drill, but other cutting devices may also be used. A second embodiment of a hole saw having efficient slug removal preferably includes a saw cup, a shank portion and a pilot cutting device. The saw cup includes a prior art saw cup, at least two side openings and a cutting surface. The at least two side openings are formed through the prior art saw cup to remove a substantial portion of a side wall.

18 Claims, 4 Drawing Sheets

HOLE SAW HAVING EFFICIENT SLUG REMOVAL

CROSS-REFERENCES TO RELATED APPLICATIONS

This is a continuation-in-part patent application taking priority from nonprovisional application Ser. No. 11/832,970 filed on Aug. 2, 2007, which takes priority from nonprovisional application Ser. No. 11/511,709 filed on Aug. 29, 2006.

BACKGROUND OF THE INVENTION

1. Field of the Invention

The present invention relates generally to hole saws and more specifically to a hole saw having efficient slug removal, which allows a slug to be removed from the hole saw without the use of additional tools.

2. Discussion of the Prior Art

The most common type of hole saw is a cup with teeth formed on an open end, a shank attached to the other end of the cup, and a drill retained in the shank. The drill starts the hole cutting process by providing a pivotal anchor for cutting the hole with the cup. However, an aggravating problem encountered with hole saws is the removal of a hole slug from the cup. Depending upon the material of the hole slug, removal of the slug can be a major challenge. If the material is plastic, the plastic hole slug will heat bond to the inside surface of the cup. There are numerous solutions proposed for removal of the hole slug. The simplest method of slug removal is to form openings in the top and/or side of the hole saw to allow the slug to be pushed or pried out with a tool.

U.S. Pat. No. 5,205,685 to Herbert discloses a hole saw. The hole saw includes an annular ring surrounding a body of the hole saw. The annular ring includes a teflon coating. However, neither the cylindrical body of the hole saw or the cutting teeth are coated with teflon. U.S. Pat. No. 6,857,831 to Davis discloses an I-joist hole cutting apparatus. The cutting apparatus includes a ring and a chord. The outer surface of the ring is treated with a low friction material, such as teflon. However, the groove cutting member is not coated with teflon.

U.S. Pat. No. 5,651,646 to Banke et al. discloses a hole saw with wood removal. The Banke et al. patent includes a cylindrical hole saw having an angular slot formed therein extending from an open end to a position beneath the planar upper end.

Accordingly, there is a clearly felt need in the art for a hole saw having efficient slug removal, which includes a saw cup with a substantial portion of a side wall removed to decrease frictional engagement with the hole created and a slug generated by the saw cup.

SUMMARY OF THE INVENTION

The present invention provides a hole saw having efficient slug removal that allows a hole slug to removed therefrom without the use of tools. The hole saw having efficient slug removal preferably includes a saw cup, a shank portion and a pilot cutting device. A plurality of cutting teeth are formed on an open end of the saw cup. An inside surface of the saw cup extending from a tip of the cutting teeth to substantially a closed end of the saw cup is given a low friction treatment. An outside surface of the saw cup extending from a tip of the cutting teeth to substantially the closed end of the saw cup is also preferably given a low friction treatment. The low friction treatment is sprayed on the inside and outside surfaces of the saw cup. The saw cup is then baked at an elevated temperature for a set period of time to bond the low friction coating to the surface of the saw cup.

The shank portion is attached to the closed end of the saw cup with any suitable fastening process. The pilot cutting device is preferably a drill, but other cutting devices may also be used. A shank opening is formed through the shank portion to receive the shank of the pilot cutting device. Preferably, a threaded fastener, such as a set screw is used to retain the pilot cutting device in the shank opening. A compression spring may be retained in the shank portion to provide extra help to remove a slug. A contact disc may be placed between the pilot cutting device and the compression spring to evenly distribute force from the compression spring against the slug.

A second embodiment of a hole saw having efficient slug removal preferably includes a saw cup, a shank portion and a pilot cutting device. The saw cup includes a prior art saw cup, at least two side openings and a plurality of cutting teeth. The at least two side openings are formed through the prior art saw cup to remove a substantially portion of a side wall thereof. The plurality of cutting teeth are preferably formed on an entire perimeter of the open end of the saw cup without the interruption of a gap. The at least two side openings create at least two support webs. A closed end of the saw cup is secured to the shank portion. A pilot cutting device is retained in the shank portion. The inside and outer surfaces of the saw cup are preferably given a low friction treatment.

Accordingly, it is an object of the present invention to provide a saw cup with a substantial portion of a side wall removed to decrease frictional engagement with the hole created and a slug generated by the saw cup.

These and additional objects, advantages, features and benefits of the present invention will become apparent from the following specification.

DETAILED DESCRIPTION OF THE PREFERRED EMBODIMENTS

Figure 1:
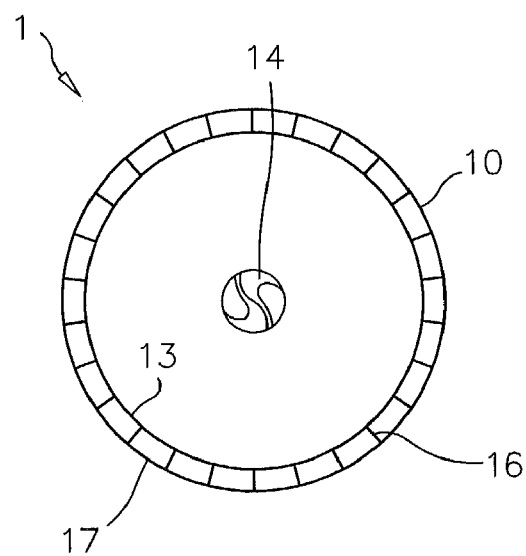
FIG. 1 is a bottom end view of a hole saw having efficient slug removal in accordance with the present invention.
Figure 2:
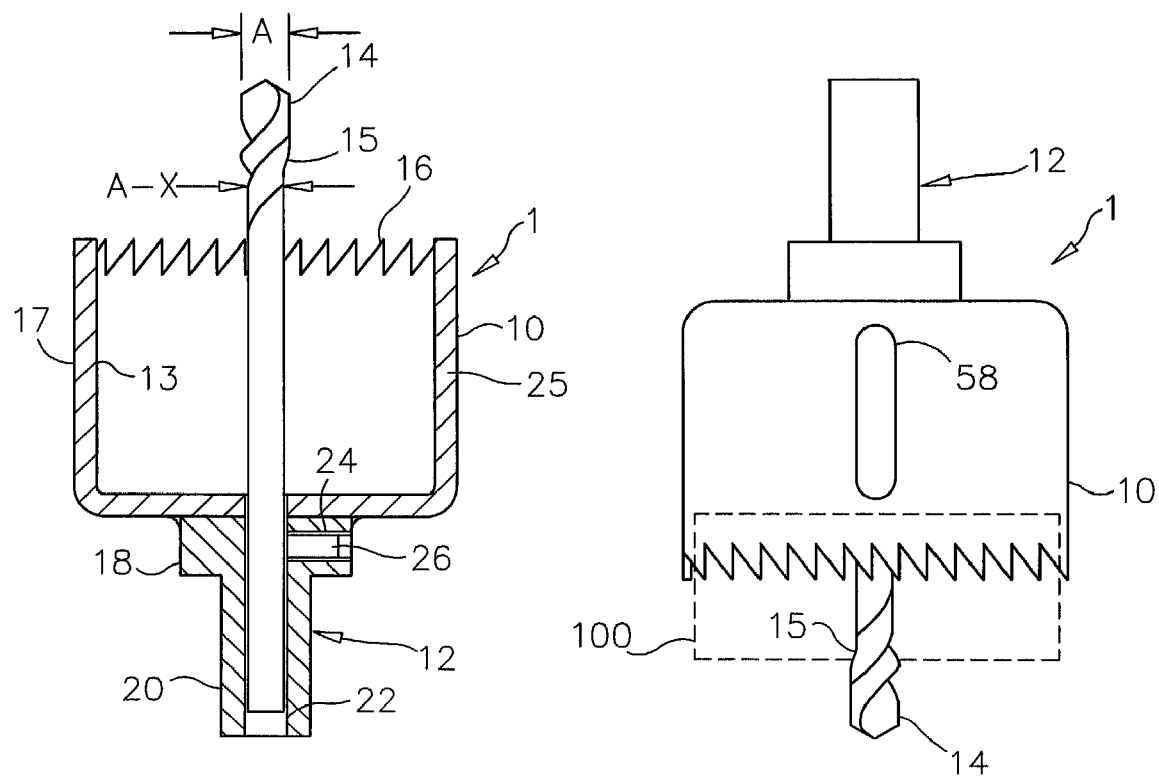
FIG. 2 is a side cross sectional view of a hole saw having efficient slug removal in accordance with the present invention.

With reference now to the drawings, and particularly to FIG. 1, there is shown a bottom end view of a hole saw having efficient slug removal 1. With reference to FIG. 2, the hole saw having efficient slug removal 1 includes a saw cup 10, a shank portion 12 and a pilot cutting device, such as a location drill 14. The shank portion 12 is attached to a closed end of the saw cup 10 with any suitable fastening process, such as welding. A plurality of cutting teeth 16 are formed on an open end of the saw cup 10.

An inside surface 13 of the saw cup 10 extending from a tip of the cutting teeth 16 to substantially the closed end of the saw cup 10 is given a low friction treatment. An outside surface 17 of the saw cup 10 extending from a tip of the cutting teeth 16 to substantially a closed end of the saw cup 10 is also preferably given a low friction treatment. The low friction treatment preferably includes applying a low friction coating to a surface and baking the low friction coating on the surface at an elevated temperature.

The following parameters are given by way of example and not by way of limitation. Satisfactory hole cutting results have been found when the inside and/or outside surfaces of the saw cup are treated in the following manner. It is preferable to use Teflon-S manufactured by DuPont for the low friction treatment. Teflon-S is a fluorinated ethylene propylene resin (FEP).

The surfaces of the saw cup 10 to be treated with Teflon-S are first degreased with a solvent cleaner. A coat of the Teflon-S is sprayed on the inside and outside surfaces of the saw cup 10. First, the saw cup 10 is preferably baked in an oven for 1-5 minutes at a temperature of 150-200 degrees Fahrenheit. The saw cup 10 is then baked at a temperature of at least 400 degrees Fahrenheit for 15 minutes. The saw cup 10 is finally baked at a temperature of at least 600 degrees Fahrenheit for another 15 minutes and preferably to 650 degrees Fahrenheit for greater abrasion resistance. The coat of the Teflon-S has a dry film thickness of between 12-20 microns. The FEP treatment reduces heat and thermal expansion of the saw cup 10 during use. The FEP treatment reduces further friction caused by expansion of the saw cup 10 during use. The saw cup 10 treated with FEP is noticeably cooler to the touch than an untreated saw cup 10. The FEP also increases the life of the saw cup 10. However, other fluoropolymers may also be used, such as Polytetrafluoroethylene (PTFE).

The shank portion 12 preferably includes a fastening portion 18 and a chuck shank 20. A drill opening 22 is formed through the fastening portion 18 and the chuck shank 20 to receive the location drill 14. A female thread 24 is preferably formed through the fastening portion 18 to the drill opening 22. A threaded fastener 26 (such as a set screw) is threaded into the female thread 24 and tightened against the location drill 14 to retain thereof relative to the shank portion 12. However, other designs of shank portions may also be used.

The location drill 14 is preferably modified such that the cutting diameter "A" has a short length and the remainder of the length is relieved, such that the remainder of the length (shank) has a diameter "A–X," which is smaller in diameter than the cutting diameter "A." The value of "X" is preferably at least 0.015 inches. Preferably, the transition from the cutting diameter "A" to the relieved diameter "A–X" is implemented with a straight taper of 10 degrees from the axis of the drill. However, other values and transition shapes besides the 10 degree straight taper may also be used.

Figure 3:
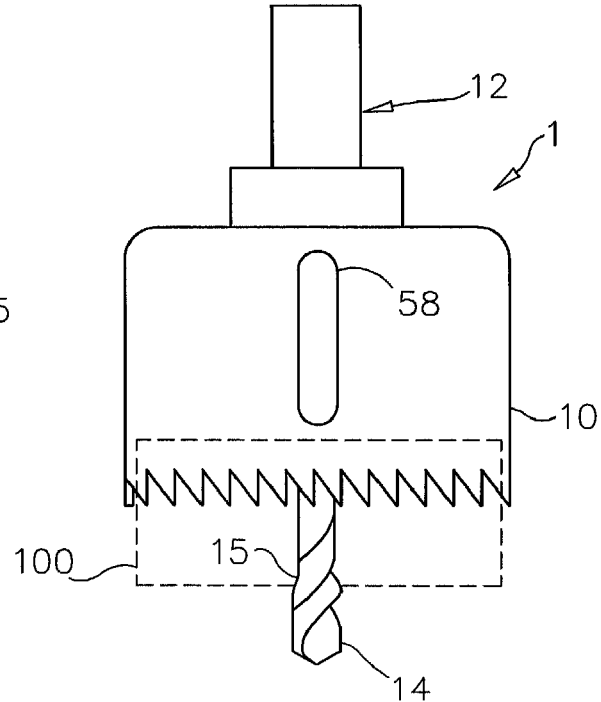
FIG. 3 is a side view of a hole saw having efficient slug removal with in accordance with the present invention.

With reference to FIG. 3, when the hole saw 1 is oriented such that the open end of the saw cup 10 is facing downward, a slug 100 drops, until thereof contacts a bottom of the cutting diameter edge 15 of the location drill 14. The slug 100 may be removed from the location drill 14 by hand. Sometimes the slug 100 will fall off the location drill 14. For some materials and hole saw sizes, a relieved location drill 14 is not necessary to aid removal of a slug 100; the slug 100 will drop off the location drill 14.

Figure 4:
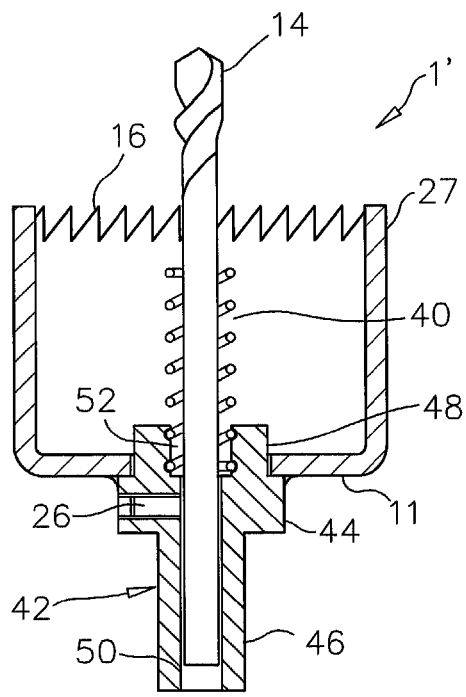
FIG. 4 is a side cross sectional view of a hole saw having efficient slug removal with a compression spring in accordance with the present invention.

With reference to FIG. 4, a compression spring 40 is added to a hole saw 1' to eject a slug, when the open end is facing upward. The compression spring 40 may be retained by creating a spring shank portion 42. The spring shank portion 42 includes a fastening portion 44, a chuck shank 46, and a spring retainer 48. A drill opening 50 is formed through the fastening portion 44 and the chuck shank 46 to receive the location drill 14. Preferably, a threaded fastener 26 (such as a set screw) is tightened against the location drill 14 to retain thereof relative to the saw cup 11. A clearance hole is formed through a top of the saw cup 11 to receive the spring retainer 48. A spring tap 52 is formed in the spring retainer 48 to threadably receive the compression spring 40. Preferably, the compression spring 40 is wound in a direction opposite the rotation of the hole saw 1', such that rotation of the hole saw 1' causes the compression spring 40 to thread into the spring tap 52. However, other methods of retaining a bottom of the compression spring 40 against a top of the saw cup 11 may also be used, such as welding, adhesive, or retention tabs on the saw cup 11, which capture a bottom of the compression spring 40.

Figure 5:
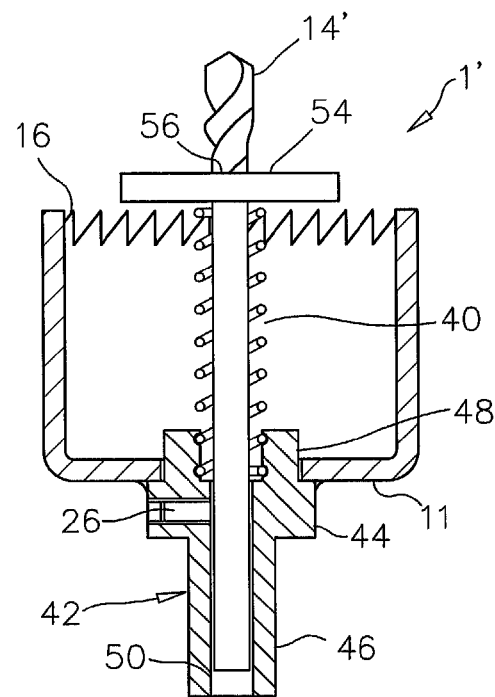
FIG. 5 is a side cross sectional view of a hole saw having efficient slug removal with a compression spring and contact disc in accordance with the present invention.

With reference to FIG. 5, a contact disc 54 is placed between a location drill 14' and the compression spring 40 to evenly distribute force from the compression spring against the slug. It is preferable to give one face of the contact disc 54 a low friction treatment to minimize friction between the slug 100 and the contact disc 54. The low friction treatment is preferably the same as that applied to the saw cup 10, 11. A transition from a cutting diameter "A" to a shank diameter is made with a square bottom edge 56 instead of the tapered cutting diameter edge 15 of the location drill 14. The square bottom edge 56 retains the contact disc 54 from traveling-up the cutting diameter "A".

Figure 6:
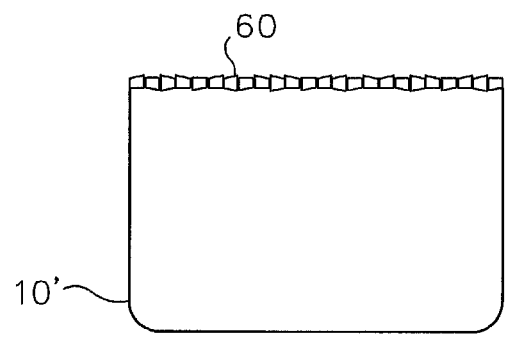
FIG. 6 is a side view of a saw cup with an abrasive cutting surface of a hole saw having efficient slug removal in accordance with the present invention.

With reference to FIG. 3, at least one removal slot 58 may be formed in a side and/or top of the saw cup 10, 11 to provide clearance for a tool (such as a screw driver), which would be used to help remove a slug from the saw cup 10, 11, if the need should arise. Other openings in the side and top of the saw cup 10, 11 may also be formed for helping the removal of an occasional stuck slug. FIG. 6 shows that the cutting teeth 16 have been replaced with an abrasive cutting surface 60 on the saw cup 10'. Other suitable cutting surfaces may also be used besides the cutting teeth 16 and the abrasive cutting surface 60.

Figure 7:
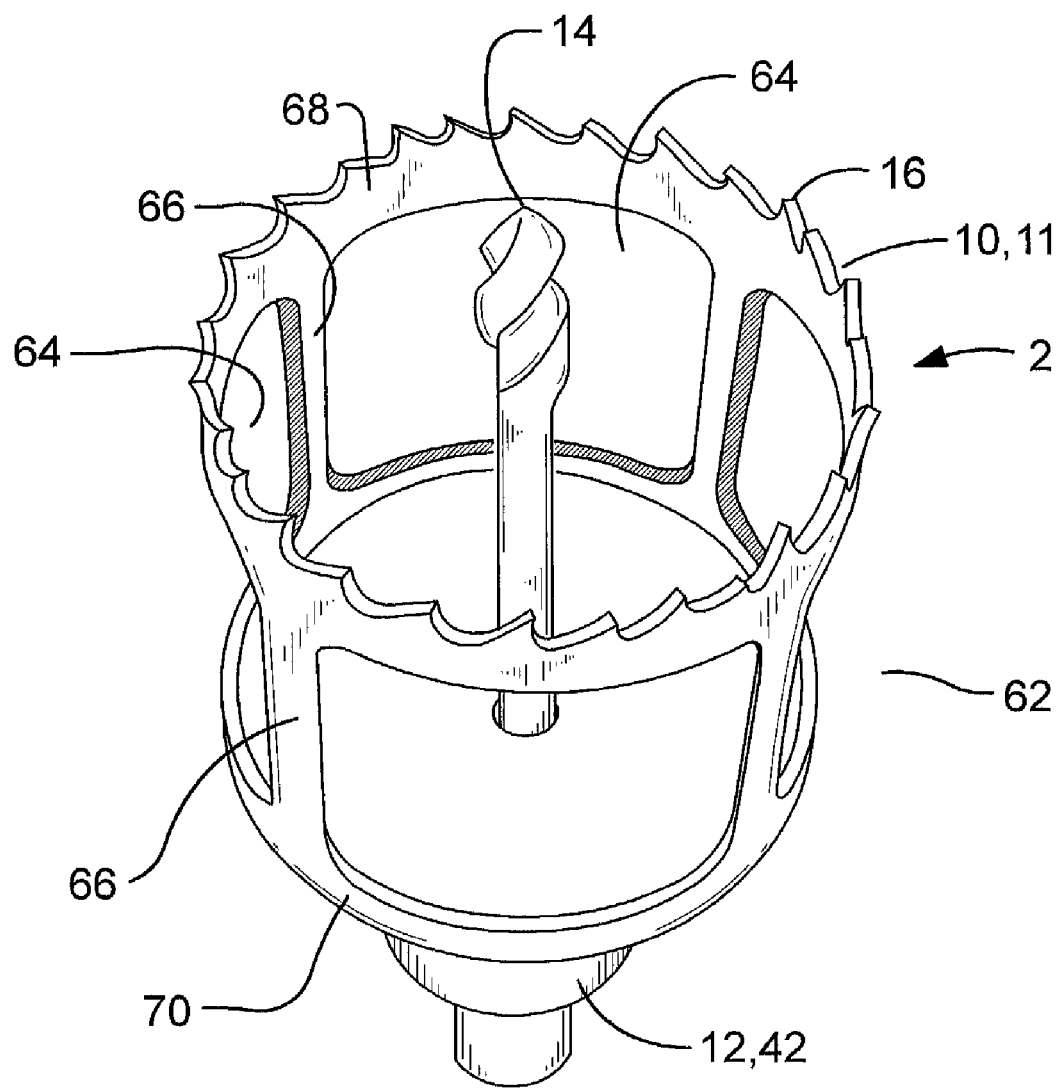
FIG. 7 is a bottom perspective view of a second embodiment of a hole saw having efficient slug removal in accordance with the present invention.
Figure 8:
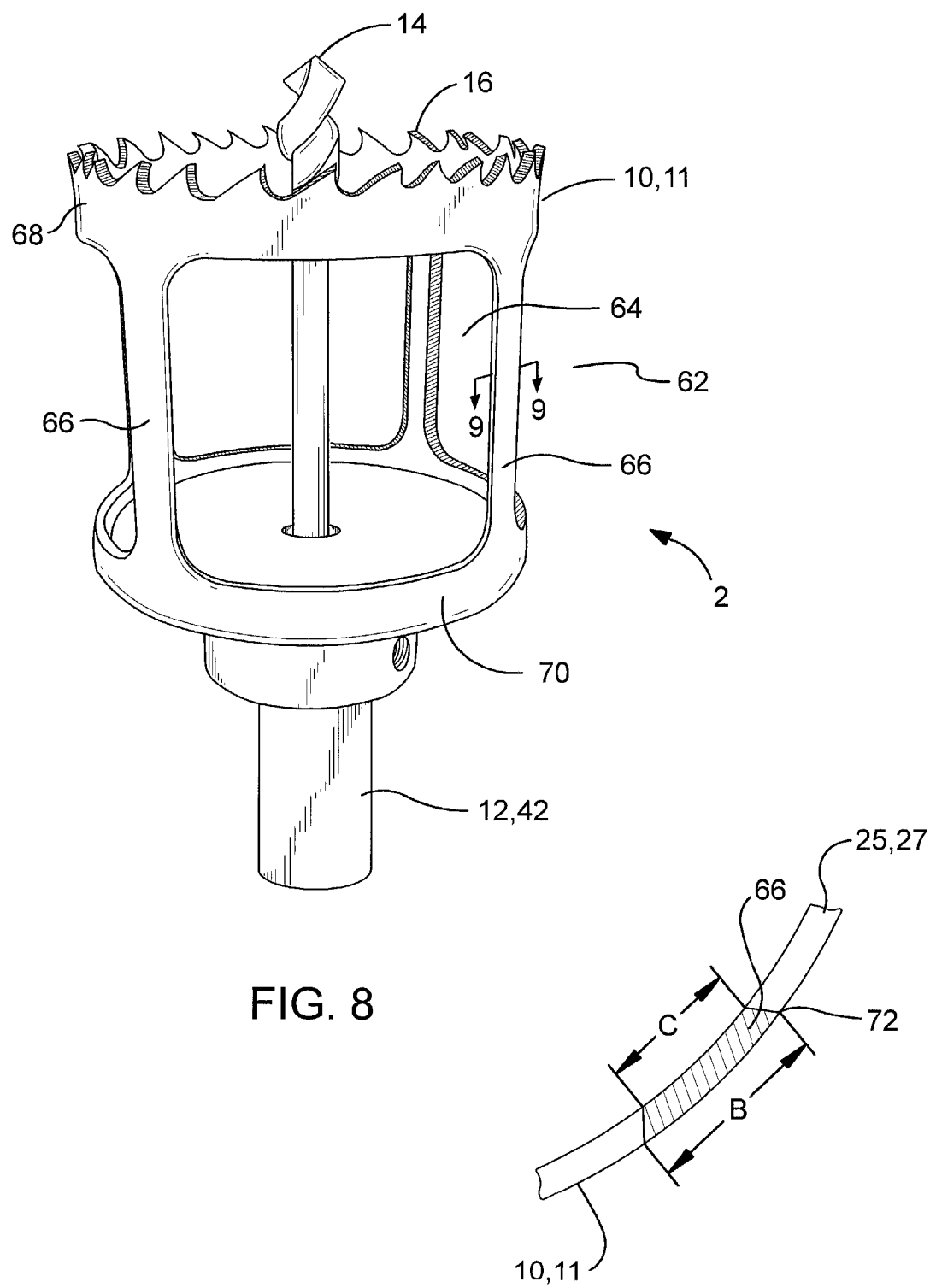
FIG. 8 is a side view of a second embodiment of a hole saw having efficient slug removal in accordance with the present invention.

With reference to FIGS. 7-8, a second embodiment of a hole saw having efficient slug removal 2 preferably includes a saw cup 62, a shank portion 12, 42 and a pilot cutting device, such as a location drill 14. The saw cup 62 includes the saw cup 10, 11, at least two side openings 64 and a plurality of cutting teeth 16. The at least two side openings 64 are formed through the saw cup 10, 11 to remove a substantial portion of a side wall 25, 27, respectively. The portion removed from the side wall 25, 27 is at least fifty percent of the side wall 25, 27. It is preferable to remove as much of the side wall 25, 27 as possible or substantially all of the side wall 25, 27. The plurality of cutting teeth 16 are preferably formed on substantially all of a perimeter of the open end of the saw cup 10, 11, without the interruption of a gap as shown in U.S. Pat. No. 5,651,646 to Banke et al.

Figure 9:
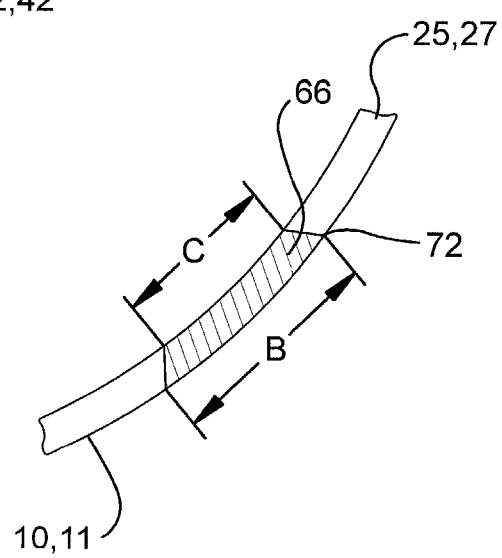
FIG. 9 is a cross sectional view of a second embodiment of a hole saw having efficient slug removal cut through FIG. 8 in accordance with the present invention.

With reference to FIG. 9, the at least two side openings 64 create at least two support webs 66, a cutting ring 68 and a shank base 70. One end of the at least two support webs 66 extending from the shank base 70 and the cutting ring 68 extending from the other end of the at least two support webs 66. The at least two support webs 66 having a surface area, which is at least less than fifty percent of said side wall 25, 27. A cross sectional width of each support web 66 preferably includes an outer dimension, which is greater than an inner dimension. Dimension B is greater than dimension C, such that at least one chamfer 72 is created to form a cutting edge 74. The plurality of cutting teeth 16 are formed on the cutting ring 68. The shank portion 12, 42 is secured to the shank base 70. A suitable pilot cutting device is retained in the shank portion 12, 42. The inside and outer surfaces of the saw cups 10, 11 are preferably given a low friction treatment to decrease the amount of friction of the saw cup 10, 11 relative to an object being cut.

The removal of at least fifty percent of the side wall 25, 27 has the unexpected result of lower the operating temperature of the saw cup 62 during use and blowing saw dust out of the saw cup 62. The lower operating temperature has the advantages of not burning the object being cut, not melting sap or adhesives in the object and providing less heat expansion to the object. The at least two support webs 66 act as fan blades to provide cooling for the saw cup 62. The low friction treatment of the saw cup 62 also reduces the amount of heat generated during cutting.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A saw cup for a hole saw having efficient slug removal comprising: a saw cup having an open end, a closed end and a side wall, a cutting surface being formed on a 360-degree cutting ring at said open end of said saw cup, at least two side openings being formed through said side wall of said saw cup between said cutting ring and said closed end, said at least two side openings removing at least fifty percent of said side wall of said saw cup, said closed end being adapted for attachment to a shank.

2. The saw cup for a hole saw having efficient slug removal of claim 1 wherein:
    providing a plurality of cutting teeth for said cutting surface.

3. The saw cup for a hole saw having efficient slug removal of claim 1, further comprising:
    at least one coat of abrasion resistant fluoropolymer resin treatment being applied to at least one of an inside surface and an outside surface of said side wall, said at least one coat of abrasion resistant fluoropolymer resin treatment being baked.

4. The saw cup for a hole saw having efficient slug removal of claim 1, further comprising:
    said shank being attached to said closed end, said shank retaining a pilot cutting device.

5. The saw cup for a hole saw having efficient slug removal of claim 4 wherein:
    said pilot cutting device being a location drill, said location drill having a cutting diameter that is greater than a shank diameter.

6. The saw cup for a hole saw having efficient slug removal of claim 4, further comprising:
    a fastener being threaded into said shank to retain said pilot cutting device.

7. The saw cup for a hole saw having efficient slug removal of claim 1 wherein:
    said at least two side openings forming at least two support webs, each one of said at least two support webs having an outside width which is greater than an inside width.

8. A saw cup for a hole saw having efficient slug removal comprising: a saw cup having an open end, a closed end and a side wall, a cutting surface being formed on a 360-degree cutting ring at said open end of said saw cup, at least two side openings being formed through said side wall of said saw cup between said cutting ring and said closed end, said at least two side openings removing at least fifty percent of a side wall of said saw cup, said closed end being adapted for attachment to a shank; and at least one coat of abrasion resistant fluoropolymer resin treatment being applied to at least one of an inside surface and an outside surface of said side wall, said at least one coat of abrasion resistant fluoropolymer resin treatment being baked.

9. The saw cup for a hole saw having efficient slug removal of claim 8 wherein:
    providing a plurality of cutting teeth for said cutting surface.

10. The saw cup for a hole saw having efficient slug removal of claim 8, further comprising:
    said shank being attached to said closed end, said shank retaining a pilot cutting device.

11. The saw cup for a hole saw having efficient slug removal of claim 10 wherein:
    said pilot cutting device being a location drill, said location drill having a cutting diameter that is greater than a shank diameter.

12. The saw cup for a hole saw having efficient slug removal of claim 10, further comprising:
    a fastener being threaded into said shank to retain said pilot cutting device.

13. The saw cup for a hole saw having efficient slug removal of claim 8 wherein:
    said at least two side openings forming at least two support webs, each one of said at least two support webs having an outside width which is greater than an inside width.

14. A hole saw having efficient slug removal comprising: a saw cup having a cutting surface formed on a 360-degree cutting ring at an open end thereof, at least two side openings being formed through a side wall of said saw cup between said cutting ring and said closed end, said at least two side openings removing at least fifty percent of said side wall; at least one coat of abrasion resistant fluoropolymer resin treatment being applied to at least one of an inside surface and an outside surface of said side wall, said at least one coat of abrasion resistant fluoropolymer resin treatment being baked; a shank portion being attached to a closed end of said saw cup; and a pilot cutting device extending from said shank portion.

15. The hole saw having efficient slug removal of claim 14 wherein:
    providing a plurality of cutting teeth for said cutting surface.

16. The hole saw having efficient slug removal of claim 14 wherein:
    said pilot cutting device being a location drill, said location drill having a cutting diameter that is greater than a shank diameter.

17. The hole saw having efficient slug removal of claim 14 wherein:

said at least two side openings forming at least two support webs, each one of said at least two support webs having an outside width which is greater than an inside width.

18. The hole saw having efficient slug removal of claim 14, further comprising:

a fastener being threaded into said shank portion to retain said pilot cutting device.

* * * * *